United States Patent Office 2,767,175
Patented Oct. 16, 1956

2,767,175

BENTONITE-QUATERNARY AMMONIUM COMPOUND COMPLEXES AND GREASES PRODUCED THEREFROM

John G. Erickson, Minneapolis, Minn., assignor to General Mills, Inc., a corporation of Delaware No Drawing. Application August 22, 1952,
Serial No. 305,911

3 Claims. (Cl. 260—242)

The present invention relates to bentonite-quaternary ammonium compound complexes and greases produced therefrom, the complexes being the reaction product of bentonite with morpholinium halides containing two fatty groups attached to the nitrogen atom. The complexes prepared from these difatty morpholinium halides are new compounds which are particularly useful in the production of greases having unusual properties.

It is known that reaction products of bentonite with quaternary ammonium compounds containing two fatty groups are useful in the production of greases. The reaction product is apparently a salt of the quaternary ammonium compound with the high molecular weight complex acid which occurs in bentonite in the form of the sodium or potassium salt. When these reaction products are mixed with hydrocarbons, grease-like gels result. Excellent greases can be prepared from heavy mineral oil with these reaction products. A grease of this type has a high flow point and an excellent service life.

It has now been found that the reaction products produced from difatty morpholinium halides have unusual properties and are particularly adapted for use in the production of gelled greases. These reaction products will be simply referred to as complexes herein. The greases produced from these complexes have greatly improved properties over those prepared from the simple bentonite reaction products referred to above. At equal solids concentrations, the greases prepared from morpholinium halides are much thicker and stiffer than those prepared from the usual quaternary ammonium compounds. This stiffness has been determined in an arbitrary manner by determining the load in grams necessary to rotate a metal spindle which is immersed in the grease and attached to a Stormer viscosity machine.

It is, therefore, an object of the present invention to provide novel complexes derived from bentonite and difatty morpholinium halides.

It is a further object of the present invention to provide novel greases prepared from the above complexes.

The difatty morpholinium halides which may be employed in the present invention are those described and claimed in my copending applications, Serial No. 257,985, filed November 23, 1951 now Patent No. 2,694,707 and Serial No. 294,702, filed June 20, 1952 now Patent No. 2,694,708, of which the present application is a continuation-in-part. These difatty morpholinium halides contain two fatty groups attached to the nitrogen atom. These fatty groups can contain from 8–22 carbon atoms, and can be either saturated or unsaturated. The carbon atoms in the morpholine ring may be unsubstituted, or may be substituted with one or more aliphatic hydrocarbon groups containing from 1–3 carbon atoms.

These morpholinium halide compounds may be formed by the reaction of a secondary fatty amine with a betahalo ether. These ethers are customarily prepared from olefins by reaction with a halogen and water. For this purpose pure olefins may be prepared, or mixtures thereof. Where mixtures of olefins are employed for preparation of the ethers, it will be apparent that a mixture of ethers may result, the mixture containing both symmetrical and asymmetrical ethers. For the purpose of the present invention, ethers may be unsubstituted or may contain one or more aliphatic hydrocarbon substituents containing from 1–3 carbon atoms attached either to the alpha or beta carbon atom.

Typical difatty morpholinium halides which may be employed in the present invention include 4,4-didodecylmorpholinium chloride, 4,4 - dioctadecylmorpholinium chloride, 4,4 - didodecyl - 2,6 - dimethylmorpholinium chloride, 4,4 - dioctadecyl - 2,6 - dimethylmorpholinium chloride, 3,3 - dimethyl - 4,4 - dioctadecylmorpholinium chloride, 4,4 - dioctadecyl - 2,6 - diethylmorpholinium bromide, 2 - methyl - 4,4 - dioctadecylmorpholinium chloride, 4,4 - dioctadecyl - 2,2,6,6-tetramethylmorpholinium chloride, and the like.

In preparing the complex, the bentonite is dispersed in water in the form of a dilute dispersion, for example, a 1% dispersion. The morpholinium compound is then dissolved in a suitable solvent, such as a lower aliphatic alcohol, for example, methanol or ethanol, and this solution is then added to the bentonite dispersion. The reaction is carried out, preferebly at room temperature, and involves the simple admixing of the solution of the morpholinium compound with the bentonite dispersion. The product appears almost immediately as a flocculent precipitate which can be readily recovered by filtration and drying. In general, it is preferred to employ sufficient of the morpholinium compound to react with all of the salt groups of the bentonite molecule, in order to introduce as many of the quaternary ammonium groups as possible.

These complexes may be used to gel a wide variety of organic materials which are essentially hydrocarbon in character. These include a wide variety of solvents and oils, including aromatic hydrocarbons such as benzene, toluene and xylene and aliphatic hydrocarbons such as gasoline, mineral oil, lubricating oil, vegetable oils, such as castor oil, linseed oil and the like. In addition, the complexes may be used to gel halogenated hydrocarbons. The complexes are preferably employed in concentration of from 5–10%, based on the combined weight of the organic material and the complexes. Thicker greases can be obtained at higher concentrations of the complex, but usually such higher concentrations are unnecessary. Below about 5% solids, the greases are softer and are not as effective as they are in the gelled condition. However, there is a definite thickening action observed even upon the addition of small quantities of the complexes.

Example 1

A mixture of 26.1 parts of dioctadecylamine and 42.9 parts of 2-chloroethyl ether was heated at 95° C. for 50 hours. It was then cooled and recrystallized successively from benzene, chloroform, methanol and ethyl acetate to give pure N,N-dioctadecylmorpholinium chloride, a white crystalline solid, melting with decomposition at 198.5–202.5° C.

Twenty parts of commercial bentonite was dispersed in 2500 parts of water. Silica was removed by centrifuging. A solution of 12.5 parts of dioctadecylmorpholinium chloride in methanol was added with stirring. The precipitate which formed was filtered off, washed with water and alcohol, and dried.

A small amount of this bentonite-morpholinium chloride complex was mixed with toluene and a thick grease resulted immediately.

Example 2

Nine parts of the bentonite-morpholinium chloride complex of Example 1 were mixed with 36 parts of heavy mineral oil, and the mixture was passed through a 3-roll paint mill. Thereafter, an additional 45 parts of mineral oil were added, and the mixture again passed through the mill. This yielded a product containing 10% solids, which was a very thick grease (stiffness 450).

*Example 3*

A mixture of 84.1 parts of dioctadecylamine, 33 parts of 1-chloro-2-propyl ether, 20.5 parts of anhydrous sodium carbonate and 320 parts of butyl alcohol was stirred and refluxed for 20 hours. It was then filtered, chilled, and filtered again. The filtrate was evaporated to dryness under reduced pressure. Unreacted amine was removed by dissolving the residue in methanol. Evaporation of the methanol, followed by recrystallization of the residue from ethyl acetate, gave 4,4-dioctadecyl-2,6-dimethyl-morpholinium chloride as a white solid, M. P. 172.5–175.5° C.

A solution of this compound in isopropyl alcohol, added to an aqueous dispersion of bentonite, produced a flocculent precipitate. This was filtered off and washed with water and acetone. When this bentonite-morpholinium chloride complex was stirred with toluene, a grease-like gel formed.

*Example 4*

A solution of 14 parts of dioctadecylmorpholinium chloride in isopropyl alcohol was added to 2000 parts of of 1% aqueous bentonite dispersion. The precipitate which formed was filtered off, washed and dried. It was milled into heavy mineral oil at 10% solids, giving a heavy grease of stiffness 600, on the arbitrary scale described above.

A similar grease, prepared by the use of dioctadecyl-dimethylammonium chloride, had a stiffness of 125.

I claim as my invention:

1. A bentonite complex consisting essentially of the reaction product of bentonite and a morpholinium halide having two alkyl groups attached to the nitrogen atom, each of said alkyl groups containing from 8 to 22 carbon atoms, said morpholinium halides being selected from the group consisting of those having an unsubstituted morpholinium nucleus and those having at least one lower alkyl substituent containing from 1 to 3 carbon atoms on the morpholinium nucleus but being unsubstituted except for alkyl groups, the bentonite and the morpholinium halide being employed in such proportions that essentially all of the exchangeable metal cation in the bentonite is replaced by the morpholinium cation.

2. A bentonite complex consisting essentially of the reaction product of bentonite and 4,4-dioctadecyl-morpholinium chloride, the bentonite and the morpholinium chloride being employed in such proportions that essentially all of the exchangeable metal cation in the bentonite is replaced by the morpholinium cation.

3. A bentonite complex consisting essentially of the reaction product of bentonite and 4,4-dioctadecyl-2,6-dimethyl morpholinium chloride, the bentonite and the morpholinium chloride being employed in such proportions that essentially all of the exchangeable metal cation in the bentonite is replaced by the morpholinium cation.

References Cited in the file of this patent

UNITED STATES PATENTS

| | | |
|---|---|---|
| 2,531,396 | Carter et al. | Nov. 28, 1950 |
| 2,531,427 | Hauser | Nov. 28, 1950 |
| 2,531,440 | Jordan | Nov. 28, 1950 |
| 2,559,398 | Capell | July 3, 1951 |